ved Nov. 10, 1964

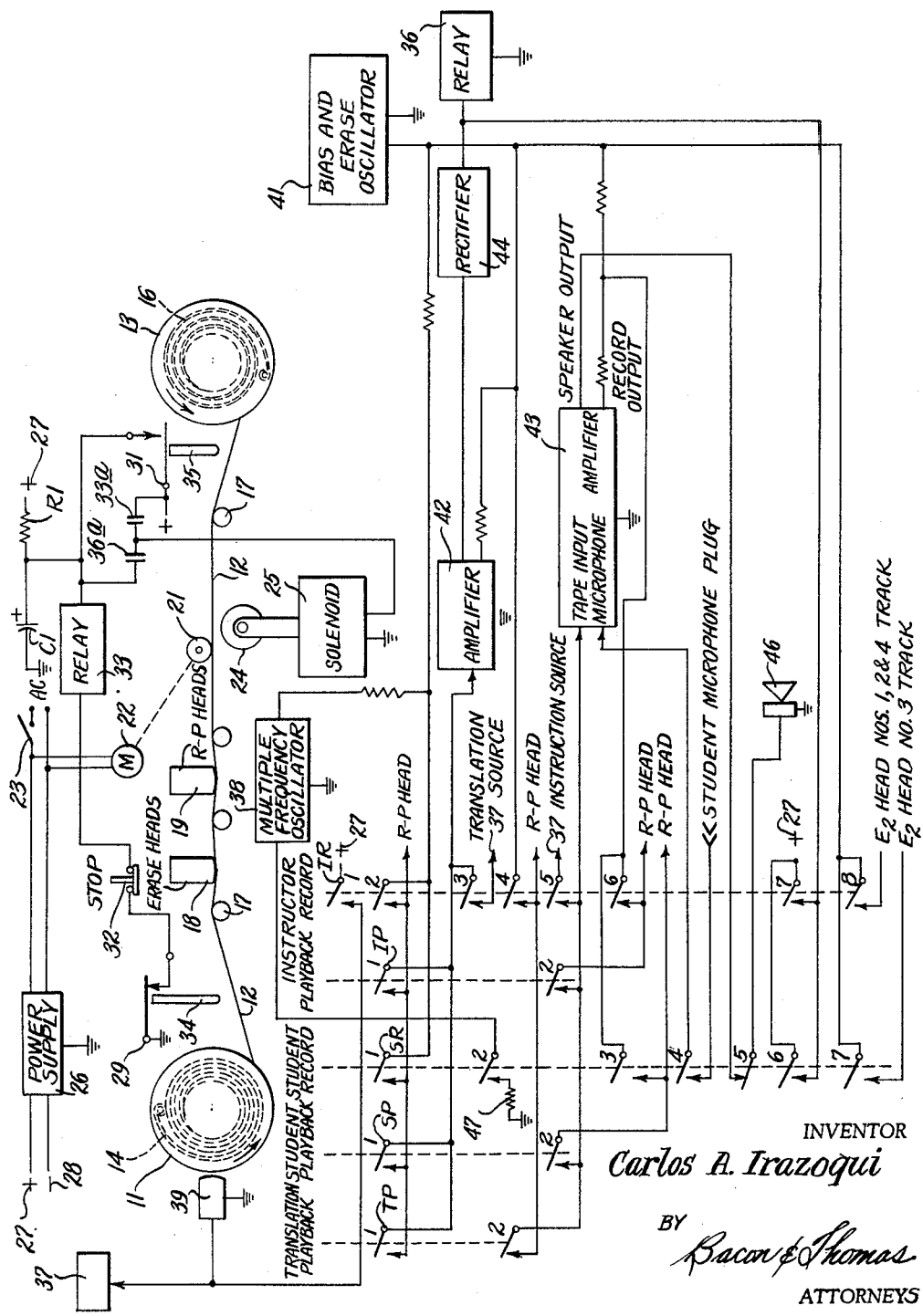

3,156,052
AUDIO INSTRUCTION REPEATER
Carlos A. Irazoqui, New York, N.Y., assignor to Electro-Mechanical Consultants, Inc., New York, N.Y., a corporation of New York
Filed Apr. 23, 1962, Ser. No. 189,419
5 Claims. (Cl. 35—35)

This invention relates to an audio instruction repeater and more particularly to a multiple track tape recorder and repeater for rerecording and repeating recorded information for the purpose of instruction.

Instruction repeater devices for use in language audio-visual and Braille instruction are known and in my co-pending United States patent application S.N. 181,068 entitled "Audio Tactual Electronic Instructor," filed March 20, 1962, I describe such a device for repeating a recorded instruction for the purpose of teaching blind or normal persons. In this arrangement, a Braille or magnetic storage tape or film having information or instructions recorded thereon is accumulated and transferred back and forth between two idler fitted rotating tables or spools to playback or repeat the recorded information on a determined length of tape, as well as to record and playback the student's voice recording of his version of the instructions.

The length of tape between the rotating tables determines the amount of recorded information that can be cyclically repeated. Thus, although the audio tactual electronic instructor automatically repeats sentences of a determined length, it does not repeat sentences of any length.

I have discovered that in Braille, language and audio-visual instruction, it is very desirable to permit the student taking the lesson to determine the length of sentence or passage he is to learn. Thus, where a student is learning French, for instance, certain passages may be more difficult, requiring the student to listen to and repeat short portions or sentences until he has mastered the entire passage. Having learned a sentence or portion thereof, the student may record his voice and compare his effort with the recorded passage.

As the student progresses, longer, continuous passages may be learned. Thus, the instruction machine must be flexible and repeat sentences or passages or variable length as determined by the student taking the instructions.

I have also discovered that it is desirable in language instruction to provide a translation in the native tongue of the student. This permits the student to not only listen and duplicate the foreign passage in his own voice but to also have a translation of the foreign passage, assuring his understanding of each passage as it is learned.

Accordingly, it is an object of this invention to provide an audio instruction repeater that repeats recorded passages of an instruction of any length as determined by the student and that records the student's voice permitting the student to compare his recorded voice with the instructions.

A further object of this invention is to provide an audio instruction repeater that repeats both an instructor's recorded passage and a translation thereof, the lengths of said passages being determined by the student.

Yet another object of this invention is to provide an audio instruction repeater that re-records varying length portions of an instructor's recorded passage on a repeater or control tape, the length of said re-recorded passages being determined by the student and that repeats the re-recording on the control tape as often as desired.

Still another object of this invention is to provide an audio instruction repeater that re-records variable length portions of a translation of an instruction as determined by the student and that repeats the re-recorded translation passages as often as desired.

Yet another object of this invention is to provide a multiple track tape recorder repeater instruction device for re-recording and repeating variable length portions of an instructor's recorded passage and translation thereof on a control tape, the lengths of said re-recorded passages being determined by a student, and including further means for recording a student's version of the instructive passages re-recorded on the control tape and means controlled by said student for selectively repeating any of said passages recorded on said control tape.

A further object of this invention is to provide a multiple track recorder repeater instruction device and control system therefor for re-recording and repeating selective lengths of an instructor's recorded passage and translation thereof on a control tape and including timing signal means for controlling the device so as to repeat only the recorded passages on the control tape.

Yet another object of this invention is to provide a multiple track recorder repeater instruction device and an electrical control system therefor including selective switching means for re-recording, recording and repeating information stored on separate tracks of a multiple track control tape.

These and many other objects may be obtained by my invention which in a preferred embodiment may be used for language, Braille or audio-visual instruction and in general comprises a multiple track tape recorder including multiple track record-playback and erase heads and control tape supply and take-up means for advancing and returning a control tape thereunder. Preferably, at least four record-playback tracks are provided which may be designated as the Timing, Instruction, Translation and Student Tracks, Numbers 1, 2, 3 and 4, respectively, for recording and playing back information on the control tape. Selective switching means are provided for the simultaneous recording of an instruction and a translation thereof on the Instruction and Translation Tracks, respectively, and which are to be repeated for a student. The switch means are so arranged that the student may record any length of instruction and translation thereof as desired.

Means responsive to a timing signal recorded on the Timing Track are provided so that the student may repeat the recorded instruction and translation thereof as often as desired whereupon operation of the selective switching means by the student permits the student to record his version of the instruction which may also be repeated as often as desired.

Although I have in general described my invention as being useful as a language instruction device, it is not intended to be limited thereby as the principles of my audio instruction repeater are subject to many modifications and may be practiced in a number of applications. For instance, phonograph or tape recorded language or other instructions and/or translations may be employed with my invention. Also, my audio instruction repeater may be used as an audio visual instruction device controlled by motion picture films or slides, either still projectors with external or self-contained sound sources. Further, my invention may be used as a telephone answering device providing a preselected answer and recording incoming messages.

Numerous other objects, advantages and uses for my invention will become apparent from the following detailed description of the accompanying drawing which is an electrical schematic of my audio instruction repeater as arranged for the teaching of a language.

As shown in the drawing, a preferred embodiment of my invention comprises a multiple track tape recorder including a tape or film supply spool 11 having a suitable length of repeater or control tape 12 wound thereon and a tape or film take-up spool 13 spaced therefrom. The supply and take-up spools 11 and 13 are rotatably mounted on spindles and biased by springs 14 and 16, respectively, so that they tend to rotate in opposite directions. The spring 14 is stronger than the spring 16 and tends to rotate the supply spool 11 in a clockwise direction to take-up the control tape 12. The spring 16 tends to rotate the take-up spool 13 in the counterclockwise direction to take up the control tape 12 but is always overcome or overpowered by the spring-biased supply spool 11 when no other forward tension or pull is exerted on the control tape 12. The ends of the control tape 12 are attached to the supply and take-up spools 11 and 13, respectively, so that the control tape cannot be removed.

The multiple track control tape 12 is threaded between suitable guides 17 and passes under multiple track erase heads 18 and multiple track record-playback heads 19. Adjacent the take-up spool 13 the multiple track control tape 12 passes between a capstan 21 driven by a suitable motor 22 connected to a source of A.C. voltage by way of a power supply switch 23 and a normally disengaged pressure roller 24 controlled by a solenoid 25.

A D.C. power supply 26 also connected to the A.C. source by way of the power supply switch 23 provides both positive and negative D.C. control voltage sources 27 and 28, respectively. Tape actuated limit switches 29 and 31 are positioned adjacent the supply and take-up spools, 11 and 13, respectively, and are interconnected by way of a manual stop switch 32 and a relay 33. The limit switches 29 and 31 are actuated by operating arms 34 and 35, respectively, which are engaged by the control tape either when the tape is fully on the take-up spool 13 or fully on the supply spool 11. Limit switch 29 is normally closed when the control tape 12 is on the supply spool 11 and limit switch 31 is normally open when the control tape 12 is on the take-up spool 13.

The relay 33 is also connected to the take-up supply spool limit switch 31 and the positive D.C. voltage source 27 by way of normally open contacts 33a controlled by the relay 33 and the normally open contacts 36a of a relay 36. The solenoid 25 is connected between the relay contacts 33a and 36a and energized by way of the positive D.C. control voltage source 27 when the control tape 12 strikes the arm 35 which closes the normally open limit switch 31 to energize the relay 33 which closes the contacts 33a. When thus energized the solenoid 25 forces the pressure roller 24 upward holding the control tape 12 in engagement with the motor driven capstan 21. The capstan 21 overcomes the spring tensioned supply spool 11 allowing the take-up spool 13 to take up the control tape.

A complete understanding of the invention can now best be had by a detailed description of the remaining electrical control circuitry. As has been stated, a multiple track tape recorder is provided including preferably four tracks designated as the Timing Track, Instruction Track, Translation Track and Student Track, respectively. The multiple head record-playback heads 19 provide for both a record and playback operation on the control tape 12 in each of the four tracks while the erase head 18 selectively erases all four tracks. Of course any number of tracks may be employed as required.

*Instruction and Translation Record*

Assuming now that it is desired to instruct an English-speaking student in French, for instance, the power supply switch 23 is turned on to energize the motor 22 to drive the capstan 21. An instruction record switch IR comprising eight ganged switches IR 1–8, respectively, is then operated to close all of the switches IR 1–8. This action performs the following operations, all of which occur simultaneously. Closure of switch IR–7 connects the positive D.C. voltage source 27 to and energizes the relay 36 to close the contacts 36a. The control tape 12 is on the supply spool 11 and the arm 35 is engaged by the control tape 12 to close the limit switch 31. In this condition, the positive D.C. voltage source 27 is connected by way of the limit switch 31 to the solenoid 25 which when energized raises the pressure roller 24 upwardly to force the control tape 12 into engagement with the rotating capstan 21 to overcome the tension of the supply spool spring 14 at which time the control tape 12 is drawn past the erase head head 18 and the record-playback head 19 by the take-up spool 13.

Closure of switch IR–1 connects the positive D.C. voltage source 27 to an instruction and translation source 37 or recorded information such as a tape recorder or phonograph or other source of recorded information which is to provide the instructions. In this arrangement, the tape recorder or instruction source 37 is arranged to be set in operation when switch IR–1 is closed and a positive D.C. voltage is connected thereto. When the switch IR–1 is open the source tape recorder 37 is stopped to interrupt the transmission or flow of instructions therefrom. Where a phonograph recording is used, suitable means may be provided for raising the phonograph arm when the switch IR–1 is open and lowering it to the exact point from which it was lifted when the switch IR–1 is again closed. Thus, switch means are provided for starting the flow of information from the instruction source 37 and for interrupting the flow of information after any desired length of recorded instruction has been listened to by the student. To resume the flow of instructions at the point where interrupted it is then merely necessary to close the switch IR–1.

In addition, the switch IR–1 is employed to control the flow of a recorded translation of the instruction in a similar manner and in this instance both the recorded instruction and translation thereof are provided by the instruction source 37.

Closure of the switch IR–1 also connects the positive D.C. voltage source 27 to a bulk erase head 39 positioned adjacent the supply spool 11. Energization of the bulk erase head 39 erases or substantially weakens all signals previously recorded on the control tape 12. It is particularly important that any timing signals previously recorded on the Timing Track be erased or weakened so that the newly-recorded timing signal is not affected.

Closure of the switch IR–2 connects the mixed outputs of a multiple frequency oscillator 38 and a bias and erase oscillator 41 to the Timing Track of the record-playback head 19. The mixed outputs of the multiple frequency oscillator 38 and bias and erase oscillator 41 makes up a timing signal of a selected frequency that is recorded on the Timing Track for control purposes. Closure of the switch IR–3 connects the recorded translation source 37 to an amplifier 42, the output of which is mixed with a suitable bias frequency provided by the bias and erase oscillator 41 and then applied to the Translation Track of the record-playback heads 19 by way of the closed switch IR–4.

At the same time, clonure of the switch IR–5 connects the instruction source 37 to the tape input terminal of an amplifier 43. The output of the tape input amplifier 43 is also mixed with a suitable bias frequency provided by the bias and erase oscillator 41 and then switched to the Instructor Track record-playback head 19 by way of the now closed switch IR–6. The remaining switch IR–8 connects erase heads 18 to the Timing Track, the Instructor Track and the Student Track, respectively.

With the circuit in this condition, the relay 36 has been energized to close contacts 36a and lock up the contacts 33a and maintain the solenoid 25 energized. The pressure roller forces the control tape 12 into engagement with the capstan 21 and the control tape 12 is now taken up by the take-up spool 13. When this occurs the limit switch 31 opens but the relay 36 remains energized and the contacts 36a closed to hold or maintain the relay 33 energized and the contacts 33a closed.

A timing signal is now being recorded on the Timing Track and the instructions and the translation thereof recorded on the Instructor Track and the Translation Track, respectively. If the recording is permitted to go on, all of the control tape 12 is transferred from the supply spool 11 to the take-up spool 13 to open the normally closed limit switch 29 deenergizing the relay 33, which opens the contacts 33a to disconnect the positive D.C. voltage source 27 from the solenoid 25. This withdraws the pressure roller 24 removing the forward tension from the control tape and allowing the spool 11 to rewind all of the control tape 12 from the spool 13.

If, however, the student desires to discontinue re-recording from the instruction and translation sources and repeat the recording either of the instruction or translation on the Instructor Track, or the Translation Track at any time, the instruction switches IR 1–8 are opened. This deenergizes the relay 36 to open the contacts 36a and break the hold circuit by way of the relay 33. The contacts 33a are opened when relay 33 is disconnected to deenergize the solenoid 25 and return the control tape 12 to the supply spool 11. Also, the instruction and translation source recorder is stopped.

The audio instruction repeater is then ready to repeat either the instruction, the translation of the instruction, or to record the student's version of the instruction.

Instruction Playback

Assuming it is desired to repeat the re-recorded instruction, an instruction playback switch IP comprising two ganged switches IP 1–2 is closed. This switches the Timing Track and the timing signal recorded thereon to the input of the amplifier 42. The timing signal is amplified and fed to a rectifier 44. If the timing signal is present, it is rectified and applied to the relay 36. This closes the contacts 36a to energize the relay 33 and again lock up the contacts 33a. The control tape 12 is now drawn by the take-up spool 13 across the playback head 19 to repeat the recorded instruction thereon.

At the beginning of the playback the timing signal on the Timing Track may be uncertain. Thus, if the limit switch 31 opens before the relay 36 is fully energized to close the contacts 36a and lock up the relay 33 and its contacts 33a, the solenoid 25 may be deenergized, allowing the supply spool 11 to withdraw the control 12. To overcome this, an R.C. time constant network comprising a capacitor C1 and a resistor R1 is connected to the limit switch 31 and the positive D.C. voltage source 27. This provides a delay determined by the time constant of the R.C. network that prevents the limit switch 31 from dropping out before the timing signal is fully established and the relay 33 and its contacts 33a locked in.

Closure of he switch IP–2 switches the Instruction Track to the tape input terminal of he amplfier 43, the output of which is fed to a speaker 46 or earphones through a normally closed switch. The instructions re-recorded on the Instruction Track are now played back until the timing signal on the Timing Track runs out, deenergizing the relay 36 to open contacts 36a. This breaks the hold circuit for the relay 33 to deenergize the solenoid 25 and return the control tape 12 to the supply spool 11. The operation may then be repeated as often as desired.

Translation Playback

If the student desires to repeat the translation of the instruction recorded on the control tape 12, the IP switches 1–2 are opened and a translation playback switch TP comprising two ganged switches TP 1–2, respectively, is closed. Closure of the switches TP 1–2 provides the same operation as the closure of the switches IP 1–2 except that now the recorded translation on the Translation Track is repeated as often as desired. Thus, the student is assured a complete understanding of the particular language instruction involved.

Student Record

Having listened to both the instruction and translation thereof, the student may now record his version of the language instruction by opening the TP switches 1–2 and closing a student record switch SR comprising seven ganged switches SR 1–7. Closure of switches SR 1–7 mixes the outputs of the multiple frequency oscillator 38 and the bias and erase oscillator 41 to provide a timing signal that is recorded on the Timing Track by the record playback head 19. The output frequency of the multiple frequency oscillator 38 is varied by means of a suitable frequency change function element such as a resistor 47 connected in circuit in a frequency control line by way of the now closed switch SR–2.

This frequency change control function provides a Student Record timing signal of a frequency different than that of the Instruction Record timing signal. This is necessary to avoid any undesirable beat frequency effect due to the previous instruction timing signal recorded on the Timing Track. Also, because it is unlikely that the student will record for the same length of time as the re-recorded instructions, it is necessary to provide a distinct student timing signal for accurate control purposes.

Closure of switch SR–4 connects the student's microphone to the amplifier 43, the output of which is fed by way of the closed switch SR–3 to and recorded on the Student Track by the record-playback head 19. The switch SR–5 is opened to disconnect the speaker 46 or earphones and the switch SR–6 closed to connect the positive D.C. voltage source 27 to the relay 36 to advance the control tape 12 and record the student's version as described. In order to assure that no signals from a previous recording remain on the Student Track, the switch SR–7 is closed to operate the erase head 18 and erase any previous recording on the Student Track.

Student Playback

The student may repeat his version of the instruction as recorded on the Student Track of the control tape 12 by opening the student record switches SR 1–7 and closing a student playback switch SP comprising two ganged switches SP 1–2, respectively. Opening of the student record switches SR 1–7 stops the student recording and returns the control tape 12 to the supply spool 11 as described. Closure of switch SP–1 switches the student timing signal on the Timing Track to the input of the amplifier 42. The output of the amplifier 42 is detected or rectified and if the student timing signal is present the relay 36 is energized to take up the control tape 12 as described. At the same time, the output of the Student Track is connected to the input of amplifier 43, by SP–2 and then to the speaker 46 by way of the normally closed switch SR–5.

When the student timing signal on the Timing Track runs out, the relay 36 is deenergized to return the control tape 12 to the supply spool 11 and the student may repeat his recorded version of the instruction as often as desired by maintaining the SP switches 1 and 2 in the closed position.

Thus, I provide an audio instruction repeater with which the student may re-record any desired length or passage of a recorded instruction and translation thereof on a control tape at will and merely by operating the correct switches. Having recorded a particular passage of an instruction and a translation thereof, the student may repeat either as often as desired until he has mastered that particular instruction and fully understands the same. At the same time, the student may record his own version of the instruction on the control tape and play it back so as to compare his version of the instruction with either the instruction given or the translation thereof. Having completely mastered this passage the student may now proceed to the next passage of instructions by merely closing the instruction record switch IR, all other record or playback switches being open. The audio instruction repeater automatically erases the previous recordings on the control tape and re-recording of the next passages of the instructions and translations continue.

Thus it can be seen that I provide an audio instruction repeater that requires a minimum of machine control by the student, permitting the student to devote all of his attention to the instruction. At the same time, however, the student may select any length of instruction and translation thereof, and play either back as often as desired. The student may also record his own version and play it back—all recording and playback being accomplished by simply operating the proper switches. This flexibility is extremely useful and desirable.

Although I have described a preferred embodiment of my audio instruction repeater as being useful for language instruction, the principles of my invention find numerous other applications and may be used in combination with Braille and audio visual instruction machines, as well as a part of a telephone answering device providing a preselected message while at the same time recording incoming messages. Therefore, it is to be understood that the foregoing description is merely illustrative of my invention which is intended to be limited only by the scope of the appended claims.

I claim:

1. In an audio instructor repeater including a multiple track tape recorder for simultaneously recording variable length instructions and translations thereof and for separately recording a student's version of said instructions on a multiple track control tape, and for selectively repeating said recordings on said control tape in response to a timing signal recorded on said control tape, a control system comprising: spring tensioned control tape, supply and take-up spools for said control tape attached to and extending therebetween, said spring tensioned supply spool overpowering said take-up spool whereby said control tape is normally on said supply spool; a driven capstan positioned adjacent said control tape; and pressure means responsive to said timing signal for holding said control tape in engagement with said capstan whereby said capstan draws said control tape from said supply spool and said take-up spool takes up said control tape drawing said control tape through said multiple track tape recorder to record information or repeat information recorded on said control tape, and for disengaging said control tape from said capstan in the absence of said timing signal whereby said supply spool withdraws said control tape from said supply spool and said take-up spool takes up said control tape drawing said control tape through said multiple track tape recorder to record information or repeat information recorded on said control tape, and for disengaging said control tape from said capstan in the absence of said timing signal whereby said supply spool withdraws said control tape from said take-up spool.

2. Apparatus as defined in claim 1 including a multiple track erase head for erasing all information recorded on said control tape as said control tape is returned to said supply spool.

3. Apparatus as defined in claim 1 including a bulk erase head for erasing said timing signal recorded on said control tape.

4. Apparatus as defined in claim 1 wherein said pressure means comprises a solenoid-actuated pressure roller for engaging and disengaging said control tape with said capstan; limit switches adjacent said take up and supply spools; and relay means connected in electrical circuit with said limit switches and responsive to said timing signal for energizing said solenoid to engage said control tape with said capstan and to disengage said control tape from said capstan in the absence of said timing signal.

5. Apparatus as defined in claim 4 including delay means connected in electrical circuit with said limit switches and said relay means whereby energization of said solenoid is delayed until the establishment of said timing signal.

References Cited by the Examiner
UNITED STATES PATENTS

| | | | |
|---|---|---|---|
| 2,514,578 | 7/50 | Heller et al. | 179—100.2 |
| 2,629,861 | 2/53 | Begun | 179—100.2 |
| 2,777,901 | 1/57 | Dostert. | |
| 2,799,731 | 7/57 | Straub. | |
| 2,892,040 | 6/59 | Johnson et al. | 35—35.3 X |
| 2,911,482 | 11/59 | Dostert | 35—35.3 X |
| 2,954,940 | 10/60 | Hermann | 242—55.12 |
| 2,975,672 | 3/61 | Shields | 179—100.2 SX |
| 3,032,286 | 5/62 | Hermann | 242—55.14 |
| 3,059,348 | 10/62 | Mezzacappa | 35—35.3 |

JEROME SCHNALL, *Primary Examiner.*

L. SIMLOW, LAWRENCE CHARLES, *Examiners.*